US011084169B2

(12) United States Patent
Graham et al.

(10) Patent No.: US 11,084,169 B2
(45) Date of Patent: Aug. 10, 2021

(54) SYSTEM AND METHOD FOR CONTROLLING A ROBOTIC ARM

(71) Applicant: General Electric Company, Schenectady, NY (US)

(72) Inventors: Andrew Crispin Graham, Badminton (GB); Herbert Chidsey Roberts, Middletown, OH (US); David Scott Diwinsky, West Chester, OH (US); Julian Matthew Foxall, Bristol (GB)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 15/986,952

(22) Filed: May 23, 2018

(65) Prior Publication Data
US 2019/0358813 A1    Nov. 28, 2019

(51) Int. Cl.
*B25J 9/16* (2006.01)
*B23P 6/00* (2006.01)
*B25J 18/02* (2006.01)

(52) U.S. Cl.
CPC ............. *B25J 9/1664* (2013.01); *B23P 6/002* (2013.01); *B25J 18/02* (2013.01); *Y10S 901/09* (2013.01)

(58) Field of Classification Search
USPC ................................................ 700/245–264
See application file for complete search history.

(56) References Cited

U.S. PATENT DOCUMENTS

| 4,118,220 | A | * | 10/1978 | von Dreusche, Jr. ..... F23G 5/28 423/88 |
| 4,260,941 | A | | 4/1981 | Engelberger et al. |
| 4,613,269 | A | * | 9/1986 | Wilder ................... B25J 9/1697 348/92 |
| 4,615,729 | A | * | 10/1986 | Victorovich .............. C22B 5/14 75/641 |
| 4,620,362 | A | * | 11/1986 | Reynolds ................. B25J 15/04 483/9 |

(Continued)

FOREIGN PATENT DOCUMENTS

CN        107234617 A    10/2017
EP          1862876 A1   12/2007

OTHER PUBLICATIONS

European Search Report Corresponding to Application No. 19175355 dated Oct. 18, 2019.

(Continued)

*Primary Examiner* — Jonathan L Sample
(74) *Attorney, Agent, or Firm* — Dority & Manning, P.A.

(57) ABSTRACT

A robotic arm assembly includes a robotic arm, a base, and a utility member, the robotic arm extending between a root end attached to the base and a distal end including the utility member. A method for controlling the robotic arm assembly includes: determining a position of the base, the root end, or both relative to the environment; determining a task position and orientation for the utility member within the environment; determining a three-dimensional constraint of the environment; and determining a path for the robotic arm through the environment based on each of the position of the base, the root end, or both relative to the environment, the task position and orientation for the utility member within the environment, and the three-dimensional constraint of the environment.

20 Claims, 8 Drawing Sheets

(56) References Cited

U.S. PATENT DOCUMENTS

| | | | |
|---|---|---|---|
| 4,706,324 A * | 11/1987 | Goodspeed | D21C 11/122 15/246 |
| 4,764,883 A | 8/1988 | Nakagawa et al. | |
| 4,831,549 A | 5/1989 | Red et al. | |
| 4,937,759 A * | 6/1990 | Vold | B25J 9/1602 700/262 |
| 4,975,856 A * | 12/1990 | Vold | B25J 9/1602 318/568.19 |
| 5,041,907 A * | 8/1991 | Sager | B25J 9/1697 348/91 |
| 5,237,468 A * | 8/1993 | Ellis | B25J 5/02 360/92.1 |
| 5,310,248 A * | 5/1994 | King | E21C 35/24 299/1.1 |
| 5,443,354 A * | 8/1995 | Stone | B25J 5/005 414/729 |
| 5,488,277 A | 1/1996 | Nishikawa et al. | |
| 5,542,650 A * | 8/1996 | Abel | F27D 3/1527 266/135 |
| 5,912,403 A * | 6/1999 | Bilke | C22B 1/24 75/773 |
| 6,165,411 A * | 12/2000 | Adachi | B22D 17/007 164/312 |
| 6,240,342 B1 | 5/2001 | Fiegert et al. | |
| 6,579,091 B1 * | 6/2003 | Simonen | B08B 1/00 15/104.16 |
| 6,941,191 B2 * | 9/2005 | Jaeger | G05D 1/0295 318/568.11 |
| 7,039,499 B1 * | 5/2006 | Nasr | B25J 9/046 206/710 |
| 7,171,279 B2 * | 1/2007 | Buckingham | A61B 1/0055 318/568.12 |
| 7,327,869 B2 * | 2/2008 | Boyer | G05B 23/0216 382/141 |
| 7,409,263 B2 * | 8/2008 | Elliott | H01L 21/67379 700/213 |
| 7,765,780 B2 * | 8/2010 | Koselka | A01D 46/30 56/10.2 A |
| 7,784,348 B2 * | 8/2010 | Dubois | G01N 21/1702 73/621 |
| 7,891,325 B2 * | 2/2011 | Koskela | F23J 1/08 122/379 |
| 8,219,246 B2 | 7/2012 | Buckingham et al. | |
| 8,340,820 B2 | 12/2012 | Nair | |
| 8,352,074 B2 | 1/2013 | Guochunxu et al. | |
| 8,374,722 B2 * | 2/2013 | Buckingham | B08B 9/045 700/253 |
| 8,930,042 B2 * | 1/2015 | Jang | G01N 29/265 701/2 |
| 8,972,057 B1 * | 3/2015 | Freeman | G01C 21/34 700/255 |
| 9,020,636 B2 * | 4/2015 | Tadayon | F24S 25/70 700/247 |
| 9,043,030 B2 | 5/2015 | Choi et al. | |
| 9,327,401 B2 * | 5/2016 | Xiao | B25J 9/1643 |
| 9,539,726 B2 * | 1/2017 | Simaan | B25J 9/1602 |
| 9,687,983 B1 | 6/2017 | Prats | B25J 19/04 |
| 9,804,593 B1 * | 10/2017 | Davis | G05B 19/423 |
| 9,873,230 B1 * | 1/2018 | DesJardien | B29C 70/388 |
| 10,019,566 B1 * | 7/2018 | Gallagher | G06F 21/31 |
| 2001/0056313 A1 * | 12/2001 | Osborne, Jr. | B25J 13/003 700/245 |
| 2002/0181650 A1 * | 12/2002 | D'Ambrosio | G01N 23/04 378/43 |
| 2003/0212505 A1 * | 11/2003 | Rojas | C21C 5/4673 702/39 |
| 2003/0217706 A1 * | 11/2003 | Pingel | B08B 9/00 122/387 |
| 2003/0229420 A1 * | 12/2003 | Buckingham | G02B 23/2476 700/245 |
| 2004/0177722 A1 * | 9/2004 | Halpin | C22B 7/003 75/303 |
| 2004/0179924 A1 * | 9/2004 | Lundahl | B65G 59/02 414/416.01 |
| 2005/0126144 A1 * | 6/2005 | Koselka | A01D 46/30 56/10.2 R |
| 2006/0101996 A1 * | 5/2006 | Paxton | B01D 51/02 95/87 |
| 2006/0218680 A1 * | 9/2006 | Bailey, III | B25J 5/00 414/217 |
| 2006/0269387 A1 * | 11/2006 | Yamaguchi | B62D 57/00 414/729 |
| 2007/0000117 A1 * | 1/2007 | Brandstatter | C25D 5/48 29/527.2 |
| 2007/0006658 A1 * | 1/2007 | Kennedy | G01N 29/343 73/622 |
| 2007/0272130 A1 * | 11/2007 | Eriksson | D21C 11/122 110/182.5 |
| 2008/0087302 A1 * | 4/2008 | Koskela | F23J 1/06 134/22.11 |
| 2008/0282486 A1 * | 11/2008 | Pingel | F23J 1/02 15/104.063 |
| 2009/0118864 A1 * | 5/2009 | Eldridge | B25J 9/1692 700/259 |
| 2011/0106306 A1 * | 5/2011 | Kim | B25J 9/1664 700/246 |
| 2011/0169202 A1 * | 7/2011 | Rosner | F27D 25/001 266/135 |
| 2011/0172818 A1 * | 7/2011 | Kim | B25J 9/1666 700/246 |
| 2011/0224688 A1 * | 9/2011 | Larkin | B25J 18/06 606/130 |
| 2011/0295427 A1 * | 12/2011 | Motzer | B25J 9/162 700/258 |
| 2012/0145682 A1 * | 6/2012 | Yeum | B23K 26/702 219/121.63 |
| 2012/0152877 A1 * | 6/2012 | Tadayon | B25J 5/005 212/224 |
| 2012/0271501 A1 * | 10/2012 | Zhao | G03B 37/005 701/25 |
| 2013/0014600 A1 * | 1/2013 | Sarr | G01N 29/043 73/866.5 |
| 2013/0231777 A1 * | 9/2013 | Salamanca | B25J 11/00 700/245 |
| 2013/0261876 A1 * | 10/2013 | Froom | B64F 5/60 701/29.3 |
| 2015/0032387 A1 * | 1/2015 | Froom | G01N 29/225 702/33 |
| 2015/0128717 A1 * | 5/2015 | May | B64F 5/60 73/800 |
| 2015/0134191 A1 * | 5/2015 | Kim | B62D 65/005 701/29.7 |
| 2015/0323501 A1 * | 11/2015 | Smith | G01N 27/902 700/245 |
| 2016/0011593 A1 * | 1/2016 | Oberoi | B29C 39/123 701/23 |
| 2016/0016312 A1 * | 1/2016 | Lawrence, III | B23Q 17/2233 700/98 |
| 2017/0080569 A1 * | 3/2017 | Kell | B25J 9/1694 |
| 2017/0151027 A1 * | 6/2017 | Walker | A61B 34/30 |
| 2017/0190052 A1 * | 7/2017 | Jaekel | G06N 20/00 |
| 2017/0239762 A1 * | 8/2017 | Roberts | F01D 25/24 |
| 2017/0268342 A1 * | 9/2017 | Roberts | B23K 9/044 |
| 2018/0003488 A1 * | 1/2018 | Hastilow | B25J 9/1671 |
| 2018/0066544 A1 * | 3/2018 | Heason | F02C 7/00 |
| 2018/0099409 A1 * | 4/2018 | Meier | G05B 13/027 |
| 2018/0147720 A1 * | 5/2018 | Kell | B25J 9/1625 |
| 2019/0054637 A1 * | 2/2019 | Asada | B25J 9/065 |

OTHER PUBLICATIONS

Canadian Office Action Corresponding to Application No. 2042730 dated Aug. 12, 2020.

Dong et al., "Development of a slender continuum robotic system for on-wing inspection/repair of gas turbine engines", Robotics and Computer Integrated Manufacturing, vol. 44, Sep. 29, 2016.

(56) References Cited

OTHER PUBLICATIONS

Sciavicco et al, "Solving the Inverse Kinematic Problem for Robotic manipulators" In: "RoManSy 6", Jan. 1, 1987, Boston, XP055762444, pp. 107-114.

* cited by examiner

SYSTEM AND METHOD FOR CONTROLLING A ROBOTIC ARM

FIELD

The present subject matter relates generally to a system and method for controlling a robotic arm through an environment.

BACKGROUND

At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Throughout the life of the gas turbine engine, it generally becomes necessary to inspect and/or repair one or more components of the gas turbine engine. Traditionally, the gas turbine engine must be uninstalled from a wing of an aircraft with which it is utilized and/or disassembled to expose the part needing inspection and/or repair. However, such may be a relatively costly and time consuming process.

Accordingly, robotic arms, may be used to inspect and/or repair certain components within the gas turbine engine without necessitating an un-installation or disassembly of the gas turbine engine. Traditionally, these robotic arms determine the path along which it travels incrementally as it passes through an environment, such as the gas turbine engine. However, the inventors of the present disclosure have discovered that such a control methodology may result in a difficulty in achieving certain task-based processes. Accordingly, an improved method for controlling a robotic arm would be useful.

BRIEF DESCRIPTION

Aspects and advantages of the invention will be set forth in part in the following description, or may be obvious from the description, or may be learned through practice of the invention.

In one exemplary aspect of the present disclosure a method for controlling a robotic arm assembly through an environment is provided. The robotic arm assembly includes a robotic arm, a base, and a utility member, the robotic arm extending between a root end attached to the base and a distal end including the utility member. The method includes: determining a position of the base, the root end, or both relative to the environment; determining a task position and orientation for the utility member within the environment; determining a three-dimensional constraint of the environment; and determining a path for the robotic arm through the environment based on each of the position of the base, the root end, or both relative to the environment, the task position and orientation for the utility member within the environment, and the three-dimensional constraint of the environment.

In certain exemplary aspects the method further includes directing the robotic arm through the environment along the path determined for the robotic arm through the environment.

For example, in certain exemplary aspects directing the robotic arm through the environment along the path determined for the robotic arm includes directing the robotic arm through the environment along the path using a tip following sequence.

In certain exemplary aspects the environment is a gas turbine engine, and wherein determining the three-dimensional constraint of the environment includes determining the three-dimensional constraint the environment using a three-dimensional electronic representation or model of the gas turbine engine.

In certain exemplary aspects the method further includes determining a set of operability limitations of the robotic arm, and wherein determining the path for the robotic arm through the environment includes determining the path for the robotic arm through the environment further based on the set of operability limitations of the robotic arm.

For example, in certain exemplary aspects determining the set of operability limitations of the robotic arm includes determining a set of joint limitations of the robotic arm, a set of geometric limitations for a plurality of segments of the robotic arm, or both.

In certain exemplary aspects the determined task position and orientation for the utility member is a first task position and orientation for the utility member, wherein the path for the robotic arm through the environment is a first path for the robotic arm through the environment. With such an exemplary aspect, the method may further include determining a second task position and orientation for the utility member within the environment; and determining a second path for the robotic arm through the environment based on each of the position of the base, the root end, or both relative to the environment, the second task position and orientation for the utility member within the environment, and the three-dimensional constraint of the environment.

For example, in certain exemplary aspects, the method may further include determining a transitional movement of the robotic arm from the first path to the second path.

For example, in certain exemplary aspects determining the transitional movement of the robotic arm from the first path to the second path includes interpolating one or more transitional paths between the first path and the second path.

For example, in certain exemplary aspects the first task position and orientation for utility member within the environment is a starting point of a task, and wherein the second task position and orientation for the utility member within the environment is an ending point of the task.

In certain exemplary aspects the path for the robotic arm through the environment includes a plurality of sequential vectors for the robotic arm to follow.

In another exemplary aspect of the present disclosure, a computer implemented method for controlling a robotic arm assembly through a gas turbine engine is provided. The robotic arm assembly includes a robotic arm, a base, and a utility member, the robotic arm extending between a root end attached to the base and a distal end including the utility member. The method includes: determining, by one or more computing devices, a position of the base, the root end, or both relative to the gas turbine engine; determining, by the one or more computing devices, a task position and orientation for the utility member within the gas turbine engine; determining, by the one or more computing devices, a three-dimensional constraint of the gas turbine engine; and determining, by the one or more computing devices, a path for the robotic arm through the gas turbine engine based on each of the position of the base, the root end, or both relative to the gas turbine engine, the task position and orientation for the utility member within the gas turbine engine, and the three-dimensional constraint of the gas turbine engine.

In certain exemplary aspects, the method may further include directing, by the one or more computing devices, the robotic arm through the gas turbine engine along the path determined for the robotic arm through the gas turbine engine.

In certain exemplary aspects determining, by the one or more computing devices, the three-dimensional constraint of the gas turbine engine includes determining, by the one or more computing devices, the three-dimensional constraint the gas turbine engine using a CAD file of the gas turbine engine.

In certain exemplary aspects, the method may further include determining, by the one or more computing devices, a set of operability limitations of the robotic arm, and wherein determining, by the one or more computing devices, the path for the robotic arm through the gas turbine engine includes determining, by the one or more computing devices, the path for the robotic arm through the gas turbine engine further based on the set of operability limitations of the robotic arm.

For example, in certain exemplary aspects determining, by the one or more computing devices, the set of operability limitations of the robotic arm includes determining, by the one or more computing devices, a set of joint limitations of the robotic arm, a set of geometric limitations for a plurality of segments of the robotic arm, or both.

For example, in certain exemplary aspects the determined task position and orientation for the utility member is a first task position and orientation for the utility member, wherein the path for the robotic arm through the environment is a first path for the robotic arm through the gas turbine engine. With such an exemplary aspect, the method may further include: determining, by the one or more computing devices, a second task position and orientation for the utility member within the gas turbine engine; and determining, by the one or more computing devices, a second path for the robotic arm through the gas turbine engine based on each of the position of the base, the root end, or both relative to the gas turbine engine, the second task position and orientation for the utility member within the gas turbine engine, and the three-dimensional constraint of the gas turbine engine.

For example, in certain exemplary aspects the method further includes determining, by the one or more computing devices, a transitional movement of the robotic arm from the first path to the second path.

In another exemplary embodiment of the present disclosure, a robotic arm assembly is provided. The robotic arm assembly includes a base; a utility member; a robotic arm extending between a root end and a distal end, the root end of the robotic arm coupled to the base and the distal end including the utility member; and a controller operable with the base, the robotic arm, or both. The controller includes one or more processors and memory, the memory storing data, the data including instructions that when executed by the one or more processors cause the robotic arm assembly to perform functions. The functions include: determining a position of the base, the root end, or both relative to an environment; determining a task position and orientation for the utility member within the environment; determining a three-dimensional constraint of the environment; and determining a path for the robotic arm through the environment based on each of the position of the base, the root end, or both relative to the environment, the task position and orientation for the utility member within the environment, and the three-dimensional constraint of the environment.

In certain exemplary aspects the instructions further include directing the robotic arm through the environment along the path determined for the robotic arm through the environment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
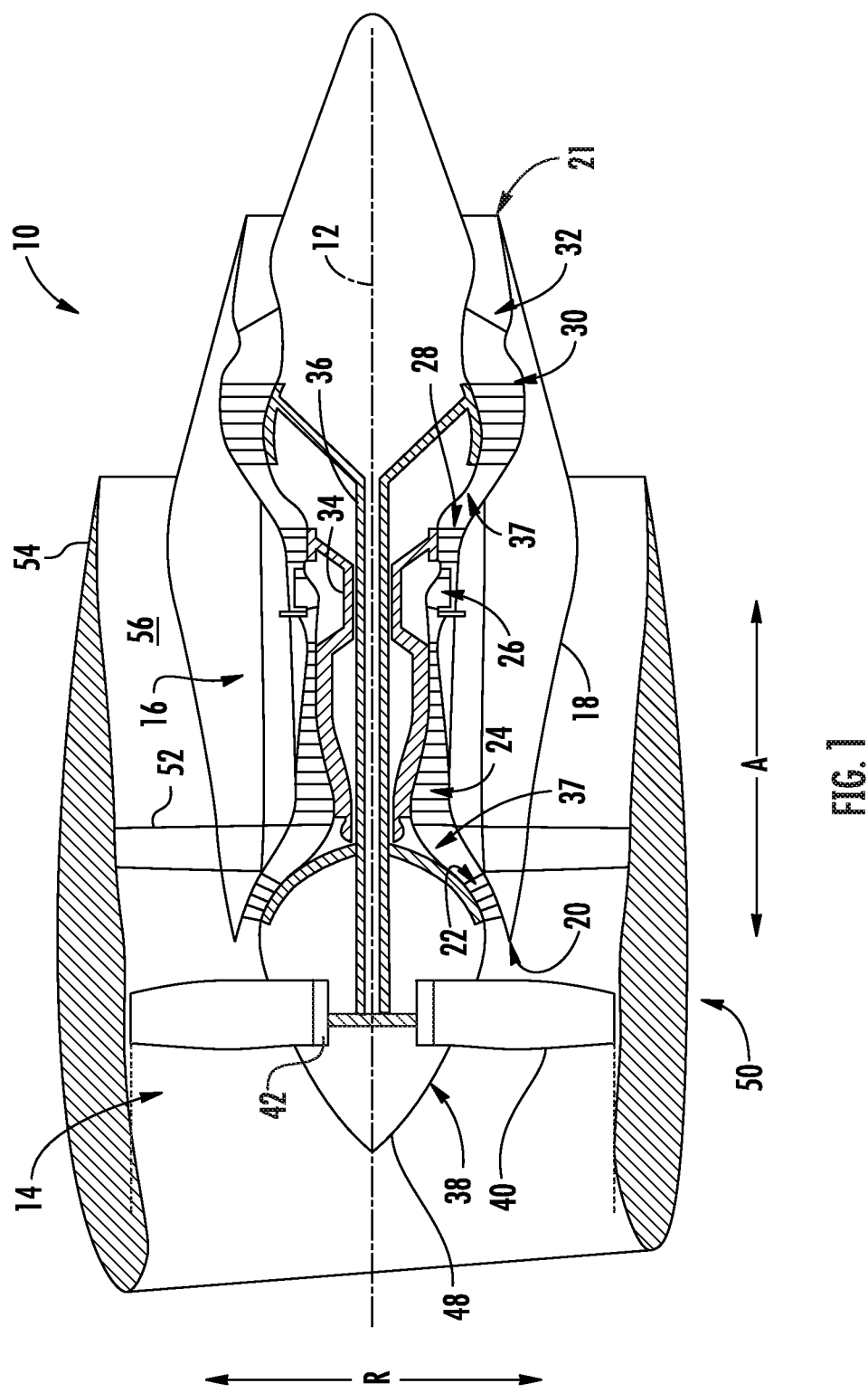
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figs., FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 also defines a circumferential direction C (see, e.g., FIG. 2) extending circumferentially about the axial direction A. In general, the turbofan 10 includes a fan section 14 and a turbomachine 16 disposed downstream from the fan section 14.

The exemplary turbomachine 16 depicted is generally enclosed within a substantially tubular outer casing 18 that defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are each attached to a disk 42, with the fan blades 40 and disk 42 together rotatable about the longitudinal axis 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the fan 38 may instead be a variable pitch fan, and the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is supported relative to the turbomachine 16 by a plurality of circumferentially-spaced outlet guide vanes 52. Moreover, a downstream section 54 of the nacelle assembly 50 extends over an outer portion of the casing 18 so as to define a bypass airflow passage 56 therebetween. The ratio between a first portion of air through the bypass airflow passage 56 and a second portion of air through the inlet 20 of the turbomachine 16, and through the core air flowpath 37, is commonly known as a bypass ratio.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools, turbines, compressors, etc. Additionally, or alternatively, in other exemplary embodiments, any other suitable turbine engine may be provided. For example, in other exemplary embodiments, the turbine engine may not be a turbofan engine, and instead may be configured as a turboshaft engine, a turboprop engine, turbojet engine, etc.

Figure 2:
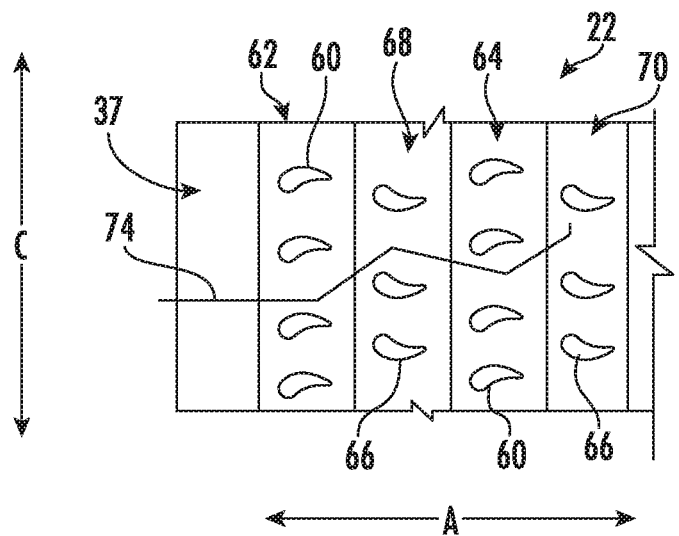
FIG. 2 it is a schematic, plan view of a section of the exemplary gas turbine engine along an axial direction and a circumferential direction.
Figure 3:
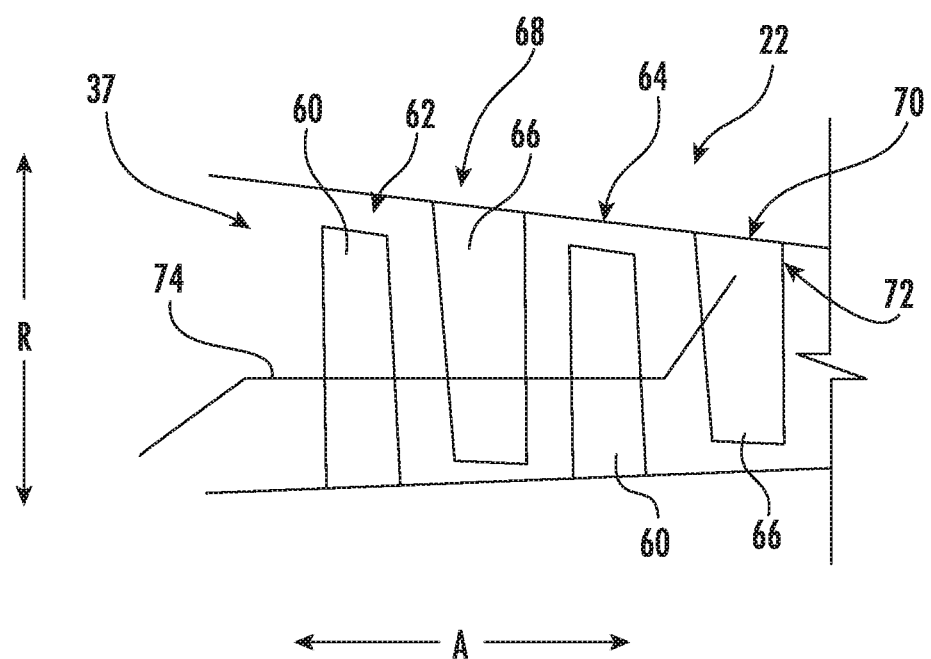
FIG. 3 is a schematic, cross-sectional view of a section of the exemplary gas turbine engine along the axial direction and a radial direction.

Referring now to FIGS. 2 and 3, it will be appreciated that the core air flowpath 37 through the turbomachine 16 generally forms an "environment" having various obstacles to be traversed in order to reach certain components positioned therein. More specifically, FIG. 2 provides a plan view of a section of the LP compressor 22 of the exemplary turbomachine 16 of FIG. 1 along the axial and circumferential directions A, C, and FIG. 3 provides a schematic view of a portion of the LP compressor 22 of the exemplary turbomachine 16 of FIG. 1 along the axial and radial directions A, R.

As is depicted, the LP compressor 22 includes a plurality of stages of LP compressor rotor blades 60, which are configured to rotate about the axial direction A of the turbofan engine 10 (i.e., along the circumferential direction C) during operation of the turbofan engine 10. More specifically, for the embodiment depicted in FIG. 2, the LP compressor 22 includes a first stage 62 of LP compressor rotor blades 60 and a second stage 64 of LP compressor rotor blades 60. The LP compressor 22 further includes a plurality of stages of LP compressor stator vanes 66, and more specifically, a first stage 68 of LP compressor stator vanes 66 and a second stage 70 of LP compressor stator vanes 66. Each of the plurality of LP compressor stator vanes 66 generally remain stationary during operation of the turbofan engine 10. As will be appreciated, in order to reach, e.g., a base portion 72 of an LP compressor stator vane 66 of the second stage 70 of LP compressor stator vanes 66, a three-dimensional path 74 must be traversed through the first and second stages 62, 64 of LP compressor rotor blades 60 and the first stage of LP compressor stator vanes 66.

Figure 4:
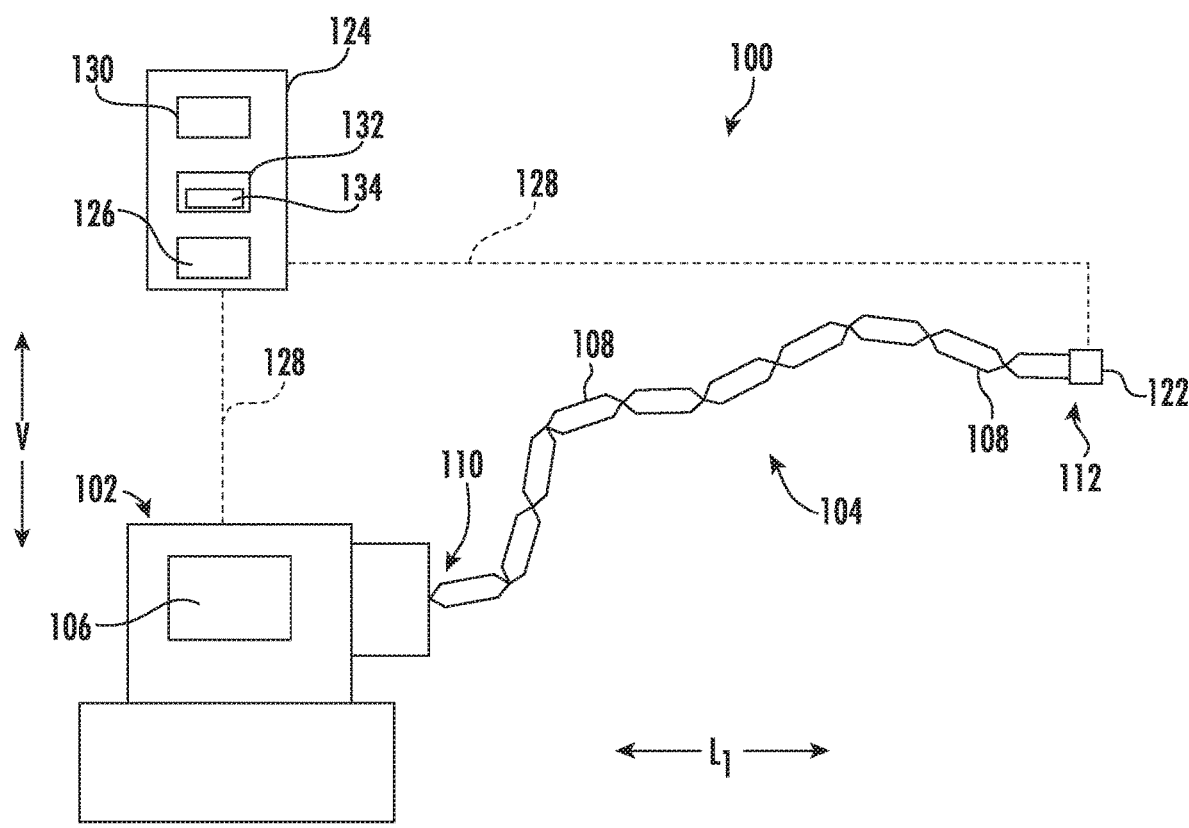
FIG. 4 is a schematic view of a robotic arm assembly in accordance with an exemplary embodiment of the present disclosure.

Referring now to FIG. 4, a robot arm assembly 100, also referred to as a "snake-arm" assembly, in accordance with an exemplary embodiment of the present disclosure is provided. The robot arm assembly 100 generally defines a vertical direction V, a longitudinal direction L1, and a lateral direction L2 (see FIG. 5), and further generally includes a base 102, a robotic arm 104, and a utility member 122. The base 102 includes one or more motors 106 operable with the robotic arm 104 to actuate the robotic arm 104. Additionally, the robotic arm 104, for the embodiment depicted, includes a plurality of segments 108 (also referred to as "links") sequentially arranged and extending from the base 102 between a root end 110 and a distal end 112, e.g., generally along the longitudinal direction L1 of the robot arm assembly 100 for the embodiment shown. Notably, the robotic arm 104 is, for the embodiment depicted, coupled to the base 102 at its root end 110.

Figure 5:
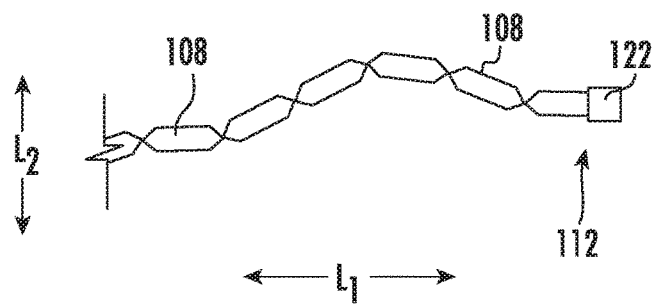
FIG. 5 is a top view of a robotic arm of the exemplary robotic arm assembly of FIG. 4.

Further, referring particularly to the robotic arm 104, each segment 108 may be movable relative to a forward-adjacent segment 108 (i.e., a segment 108 immediately forward of the segment 108/towards the distal end 112) and aft-adjacent segment 108 (i.e., a segment 108 immediately aft of the segment 108/towards the root end 110) along at least two degrees of operation, as is depicted to form the two-dimensional shape of the robotic arm 104 in FIG. 4. For example, each segment 108 may be movable up or down relative to the forward-adjacent and aft-adjacent segments 108 along the vertical direction V of the robot arm assembly 100. More specifically, referring briefly also to FIG. 5, providing a top view of the exemplary robotic arm 104 of FIG. 4, it will be appreciated that for the exemplary embodiment depicted, each segment 108 is further movable relative to a respective forward-adjacent and aft-adjacent segment 108 along at least four degrees of operation. For example, as is depicted in FIG. 5, each segment 108 may also be movable along a lateral direction L2 relative to the forward-adjacent and aft-adjacent segments 108. In such a manner, the robotic arm 104 may generally be movable to form various three-dimensional shapes.

It will be appreciated, that in at least certain exemplary embodiments, the one or more motors 106 of the base 102 may generally pull on various wires (not shown) extending through the robotic arm 104 and terminating at individual segments 108 of the robotic arm 104. By pulling on these various wires, the one or more motors 106 of the base 102 may control a movement of the segments 108 of the robotic arm 104. However, in other embodiments, any other suitable configuration may be provided for controlling the robotic arm 104.

Figure 6:
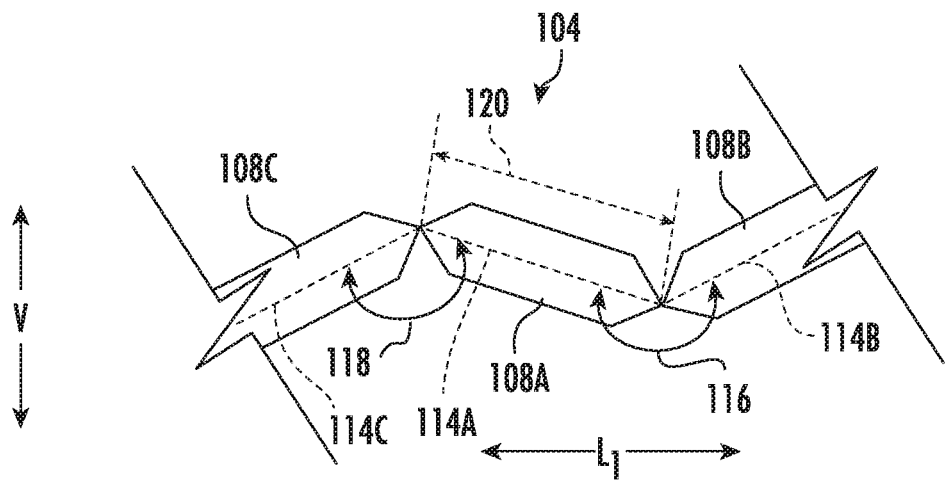
FIG. 6 is a close-up view of a plurality of segments of the exemplary robotic arm of the exemplary robotic arm assembly of FIG. 5.

Notably, the robotic arm 104 defines a set of operability limitations. For example, referring briefly to FIG. 6, a close-up view of a segment 108 of the exemplary robotic arm 104 of FIGS. 4 and 5 is provided. Specifically, FIG. 6 provides a close-up view of a first segment 108A of the robotic arm 104, along with a second segment 108 B located immediately forward of the first segment 108 A (i.e., a forward-adjacent segment) and a third segment 108 C located immediately aft of the first segment 108 A (i.e., an aft-adjacent segment). As is depicted, the first segment 108A generally extends along a first local axis 114, and similarly, the second segment 108B extends along a second local axis 114B and the third segment 108C extends along a third local axis 114C. The first local axis 114A of the first segment 108A defines a forward bend angle 116 with the second local axis 114B of the second segment 108B, and further defines an aft bend angle 118 with the third local axis 114C of the third segment 108C. The forward bend angle 116 depicted represents a maximum bend angle between two segments 108 of the robotic arm 104, and the aft bend angle 118 depicted represents a minimum bend angle between two segments 108 of the robotic arm 104. Additionally, each of the segments 108 defines a length 120 (measured as a linear distance between a forward and aft joint with the forward and aft segments 108, respectively). The minimum and maximum bend angles and lengths 120 of the segments 108 of the robotic arm 104 may be the same for each of the plurality of segments 108 of the robotic arm 104, or alternatively, certain of the segments 108 may define, e.g., increased or decreased maximum bend angles, increased or decreased minimum bend angles, varying lengths, varying degrees of movement/freedom, etc. These parameters may be referred to as a set of operability limitations for the robotic arm 104. Specifically, these parameters may generally dictate the available three-dimensional shapes that the robotic arm 104 may form.

Notably, the robotic arm 104 may further define additional sets of operability limitations. For example, the robotic arm 104 may define load limitations (e.g., an amount of weight the robotic arm 104 may carry for a given distance from the base 102), torque limitations, etc. Further, the operability limitations of the robotic arm 104 may include information regarding available movement of the base 102 and/or root end 110 of the robotic arm 104. For example, as is discussed below, the base 102 and/or root end 110 of the robotic arm 104 may be mounted on another robot or joint(s) that allow for the modification of a position and/or an orientation of the base 102 and/or root end 110 of the robotic arm 104 (e.g., one or both may be moveable along one or more of the longitudinal direction L1, lateral direction L2, and vertical direction V, and/or moveable about one or more of the longitudinal direction L1, lateral direction L2, and/or vertical direction V. Such may increase an operability of the robotic arm 104.

Referring back particularly to FIG. 4, as briefly noted above, the robotic arm assembly 100 additionally includes the utility head 122 attached to, or integrated with the robotic arm 104 at the distal end 112 of the robotic arm 104. The utility head 122 may be removable/interchangeable, or alternatively, may be fixed to the robotic arm 104. In at least certain exemplary embodiments, the utility head 122 may have one or more sensors embedded therein, such as one or more proximity sensors, cameras, etc. Additionally, or alternatively, the utility head 122 may have one or more tools/implements, such as a laser cutting tool, a welding tool, etc.

As is also depicted in FIG. 4, the robot arm assembly 100 further includes a controller 124 operable with the base 102, the robotic arm 104, or both. Although the controller 124 is depicted as being positioned physically separate from the base 102 of the robotic arm assembly 100, in other embodiments, the controller 124 may be positioned, or otherwise integrated into, the base 102 of the robotic arm assembly 100. Additionally, or alternatively, the controller 124 may be integrated into, and/or operable with, any other suitable system.

The controller 124 generally includes a network interface 126. The network interface 126 may be operable with any suitable wired or wireless communications network for communicating data with other components of, e.g., the robotic arm assembly 100, and/or other components or systems not depicted. As depicted using phantom lines in FIG. 4, for the embodiment depicted, the network interface 126 utilizes a wireless communication network 128 to communicate data with other components. Specifically, for the embodiment shown, through the network interface 126 of the controller 124 and the wireless communication network 128, the controller 124 is operably coupled to the base 102 of the robotic arm assembly 100, and more specifically, is operably coupled to the one or more motors 106 of the base 102 of the robotic arm assembly 100. In such a manner, the controller 124 may control operation of the robotic arm 104 by controlling operation of the one or more motors 106. Also through the network interface 126 and wireless communications network 128, the controller 124 is operably coupled to the utility head 122. In such a manner, the controller 124 may receive data from, e.g., one or more sensors positioned within the utility head 122 and/or may control the one or more implements of the utility head 122.

It will be appreciated, of course, that although the network interface 126 utilizes the wireless communication network 128 for the embodiment of FIG. 4, in other embodiments, the network interface 126 may instead utilized a wired communication network, or a combination of wired and wireless communication networks.

Referring still to FIG. 4, the controller 124 further includes one or more processors 130 and memory 132. The memory 132 stores data 134 accessible by the one or more processors 130. The one or more processor(s) 130 can include any suitable processing device, such as a microprocessor, microcontroller, integrated circuit, logic device, and/or other suitable processing device. The one or more memory device(s) 132 can include one or more computer-readable media, including, but not limited to, non-transitory computer-readable media, RAM, ROM, hard drives, flash drives, and/or other memory devices. The data 134 may include instructions that when executed by the one or more processors 130 cause the robot arm assembly 100 to perform functions. One or more exemplary aspects of these functions may be described below with respect to the exemplary method 200 of FIG. 13. Accordingly, it will be appreciated that the exemplary method 200 described below with reference to FIG. 13 may be a computer-implemented method.

The instructions within the data 134 can be any set of instructions that when executed by the one or more processor(s) 130, cause the one or more processor(s) 130 to perform operations. In certain exemplary embodiments, the instructions within the data 134 can be software written in any suitable programming language or can be implemented in hardware. Additionally, and/or alternatively, the instructions can be executed in logically and/or virtually separate threads on processor(s) 130. The memory device(s) 132 can further store other data 134 that can be accessed by the processor(s) 130.

Figure 7:
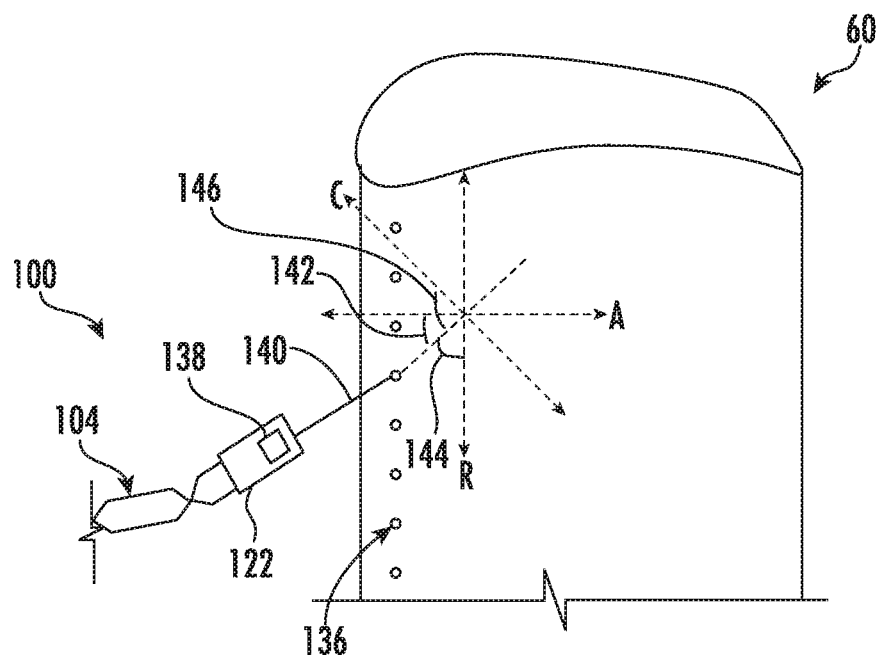
FIG. 7 is a close-up view of a utility member of a robotic arm assembly in accordance with an exemplary embodiment of the present disclosure.

Referring now to FIG. 7, a close-up view of an LP compressor rotor blade 60 and a utility head 122 of a robotic arm assembly 100 in accordance with an exemplary embodiment of the present disclosure is provided. The robotic arm assembly 100, and utility head 122, may be configured in substantially the same manner as exemplary robotic arm assembly 100 described above with reference to FIGS. 4 through 6. Additionally, the LP compressor rotor blade 60 may be configured in substantially the same manner as one or more the exemplary LP compressor rotor blades 60 described above with reference to FIGS. 1 through 3. Accordingly, the same or similar numbers refer to the same or similar parts.

The utility head 122 of the robotic arm assembly 100 depicted is in a particular position and orientation to perform a task (i.e., a "task position and orientation"). For example, the exemplary LP compressor rotor blade 60 of FIG. 7 defines a plurality of cooling holes 136. Also, for the embodiment depicted, the utility head 122 of the robotic arm 104 includes a laser implement 138 for laser drilling, and more specifically, to drill through, e.g., a clogged cooling hole 136 in the LP compressor rotor blade 60. In such a manner, it will be appreciated that the environment, i.e., a turbofan engine 10 including an LP compressor 22 having the exemplary LP compressor rotor blades 60, defines a coordinate system. For the embodiment depicted, the coordinate system includes an axial direction A, a radial direction R, and a circumferential direction C. The task position and orientation includes a location along the defined coordinate system (i.e., a value along the axial direction A, along the radial direction R, and along the circumferential direction C), as well as an orientation within the coordinate system. More specifically, the laser implement 138 defines an axis 140, and the task position and orientation defines an angular orientation of the axis 140 of the laser implement 138, such that the axis 140 of the laser implement defines a first angle 142 with the axial direction A, a second angle 144 with the radial direction R, and a third angle 146 width of the circumferential direction C. By specifying a particular position and orientation, it may be ensured that the laser implement directs the laser along a desired vector and in a desired position.

Figure 8:
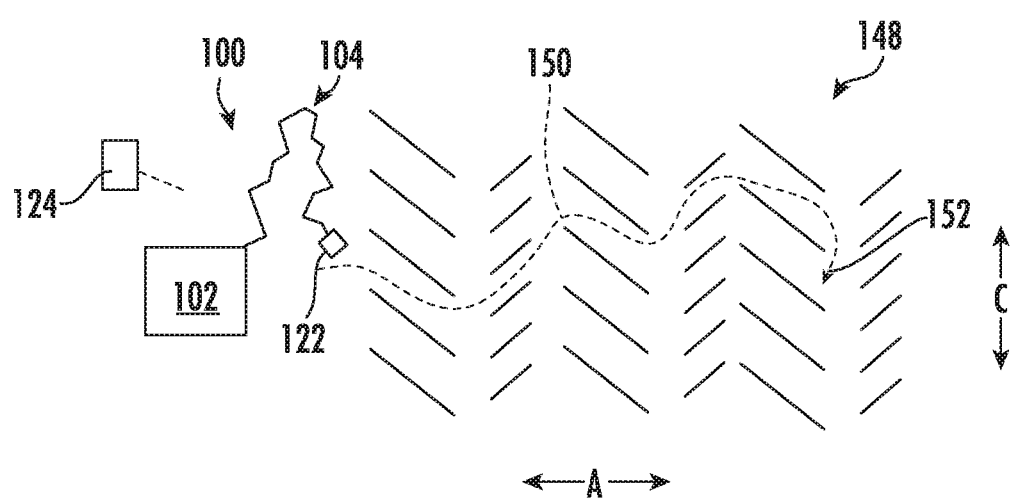
FIG. 8 is a schematic view of a path for a robotic arm of a robotic arm assembly through an environment in accordance with an exemplary embodiment of the present disclosure.

Referring now to FIG. 8, an exemplary path 150 through an environment 148 for a robotic arm 104 of a robotic arm assembly 100 to position a utility head 122 of the robotic arm 104 at a desired task position and orientation is provided. The robot arm assembly 100 may be configured in substantially the same manner as exemplary robot arm assembly 100 described above, and further, the environment 148 may be configured in substantially the same manner as one or more the exemplary gas turbine engine environments described above.

More specifically, it will be appreciated that for the exemplary embodiment depicted in FIG. 8, a position of a base 102, of a root end 110 of the robotic arm 104, or both relative to the environment 148 is known (relative to a coordinate system of the environment 148, which for the embodiment shown is an axial direction A, radial direction R, and circumferential direction C coordinate system). The position of the base 102 or root end 110 may be manually input to, e.g., a controller 124 of the robotic arm assembly 100, or alternatively may be determined by the controller 124 using, e.g., one or more sensors of the robotic arm assembly 100. It will be appreciated, that in addition to the position of the base 102 or root end 110, the controller 124 may additionally know the orientation of the base 102 or root end 110. Further, the base 102 and/or root end 110 of the robotic arm 104 may be mounted on another robot or joint(s) that allow for the modification of the position and/or orientation of the base 102 and/or root end 110 of the robotic arm 104. With such a configuration, the position and/or orientation of the base 102 or root end 110 may be communicated to the controller 124, or may be controlled by the controller (and therefore known by the controller 124).

Additionally, a task position and orientation 152 for the utility member of the robotic arm 104 within the environment 148 is known. The task position and orientation 152 may similarly be input into the controller 124, or alternatively may be determined, e.g., as a result of an inspection of the environment 148. For example, the controller 124 may note a defect through an inspection of the environment 148, and automatically determine a task position and orientation for the utility head 122 of the robotic arm assembly 100. Further, a three-dimensional constraint of the environment 148 is known. The three-dimensional constraint the environment 148 may be determined by the controller 124 using, e.g., a three-dimensional electronic representation or model of the environment 148. For example, the controller 124 may use a computer-aided design ("CAD") file, and/or may determine the three-dimensional constraint through inspection or scan of the environment 148. Notably, for the embodiment depicted, the environment 148 may be similar to, e.g., the LP compressor 22 described above with reference to, e.g., FIGS. 2 and 3. Accordingly, the three-dimensional constraint of the environment 148 may be determined using, e.g., one or more CAD files for the LP compressor 22 (and turbofan engine 10), a three-dimensional mapping of the LP compressor 22, or any other suitable means. Of course, in other exemplary embodiments, the environment 148 may be any other suitable environment, such as any other suitable section of the gas turbine engine, or other engine or system.

Further, still, a set of operability limitations of the robotic arm 104 is known (based on an input to the controller 124, or, e.g., by sensing the operability of the robotic arm 104).

Based on the above factors, the robotic arm assembly 100, and more specifically, the controller 124 the robotic arm assembly 100, is configured to determine the path 150 for the robotic arm 104 through the environment 148 for positioning the utility implement 122 of the robotic arm 104 in the determined task position and orientation 152 within the environment 148. For example, the path 150 may be determined by starting with the known task position and orientation 152, and subsequently constraining the path 150 based on the three-dimensional constraints of the environment 148, the set of operability limitations of the robotic arm 104, and the position of the base 102, the root end 110, or both relative to the environment 148.

With such an approach, the path 150 may be determined with the end goal of positioning the utility member in the desired task position and orientation 152 as a key parameter. Such is an improvement over simply determining the path 150 for the robotic arm 104 in real time as the robotic arm 104 is guided through the environment 148, as it may result in a more efficient path 150 for the robotic arm 104, while ensuring the desired task is achievable by planning the path 150 based on the known task position and orientation 152.

Notably, the path 150 determined for the robotic arm 104 may include a plurality of sequential coordinates (e.g., X1, Y1, Z1; X2, Y2, Z2; X3, Y3, Z3; etc., or rather A1, R1, C1; A2, R2, C2; A3, R3, C3; etc.) for the robotic arm to follow within the three-dimensional environment 148. Additionally, it should be appreciated that the path 150 may also include orientation information for the robotic arm 104 at these positions (and/or between these positions) within the three-dimensional environment 148. The orientation information may include angular information for the links 108 of the robotic arm 104 at each of the coordinates relative to each axis of the coordinate system of the environment 148 (e.g., relative to the axial direction A, radial direction R, and circumferential direction C), such that the path 150 includes information for up to six degrees of movement along some or all of the path 150. For example, if a tool or utility member 122 at the distal end of the robotic arm 104 has a greater extent in one dimension than another (e.g., taller than it is wide), it may further be necessary to ensure the robotic arm 104 moves through the three dimensional environment 148 with the appropriate orientation, in addition to the appropriate position. Accordingly, it will be appreciated that in at least certain exemplary aspects of the present disclosure, determining the path 150 may include determining the path 150 further in view of certain dimensions of the utility member 122 and/or an orientation of the base 102, root end 110, or both (in addition to its position).

Figure 9:
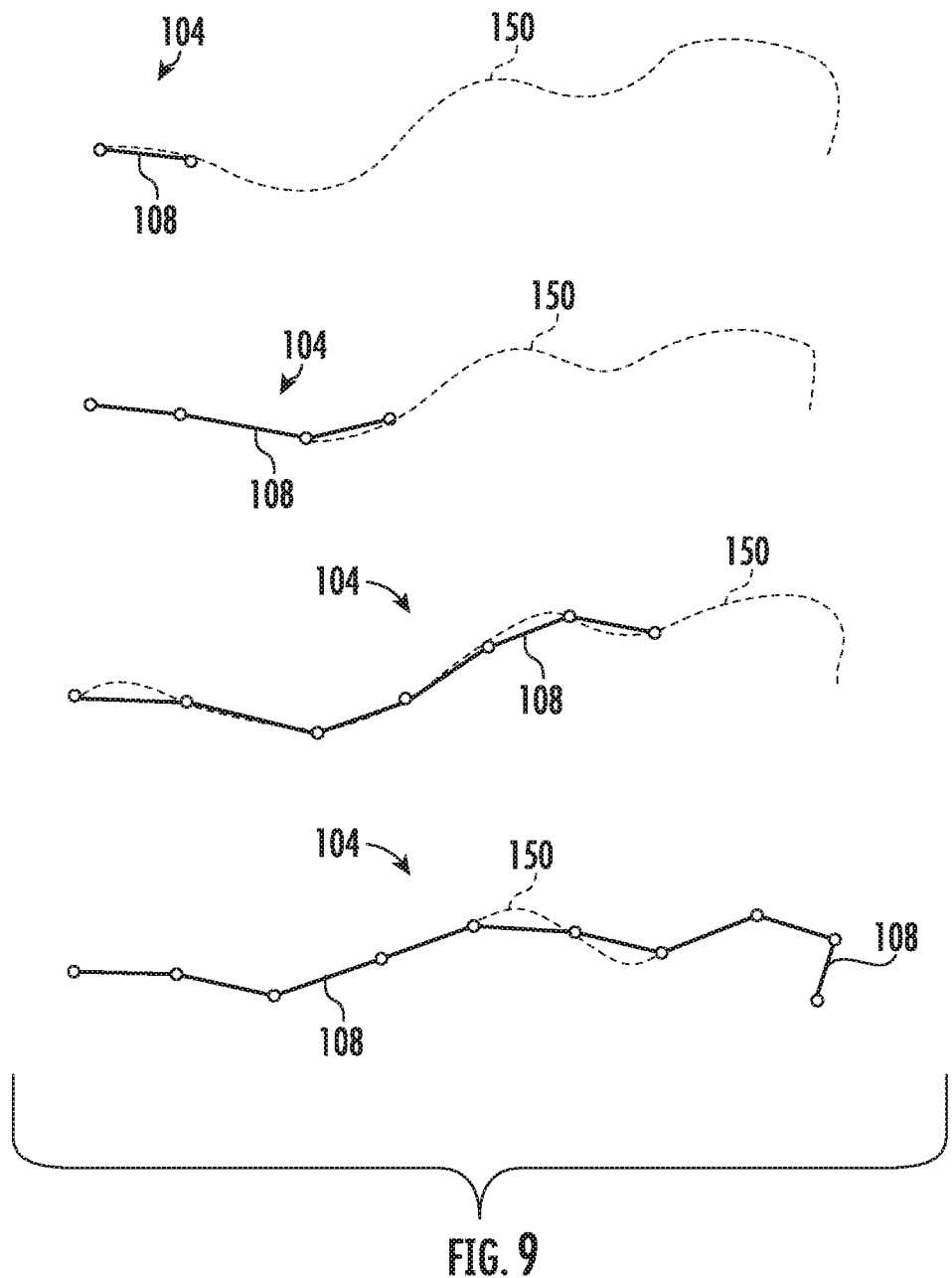
FIG. 9 is a schematic of a tip following sequence for a robotic arm of a robotic arm assembly.

Further, referring now briefly to FIG. 9, it will be appreciated that once the path 150 is determined, the controller 124 (see, e.g., FIG. 4) may direct the robotic arm 104 of the robotic arm assembly 100 along the path 150 using a tip-following sequence. As will be appreciated, when directing the robotic arm 104 through the environment 148 along the path 150 using the tip-following sequence, sequential segments 108 of the robotic arm 104 follow the path 150 of previous segments 108 to ensure that the robotic arm 104 is inserted along the determined path 150. Such may minimize a risk of collision between the robotic arm 104 and the environment 148. As will be appreciated, however, directing the robotic arm 104 through the environment 148 along the path 150 using the tip-following sequence may include controlling the robotic arm 104 link 108 by link 108, or alternatively by controlling several links 108 as a unit (i.e., a section of the arm 104 as one) to provide for greater degrees of freedom, and/or greater bend angles, than a single joint possesses.

Figure 10:
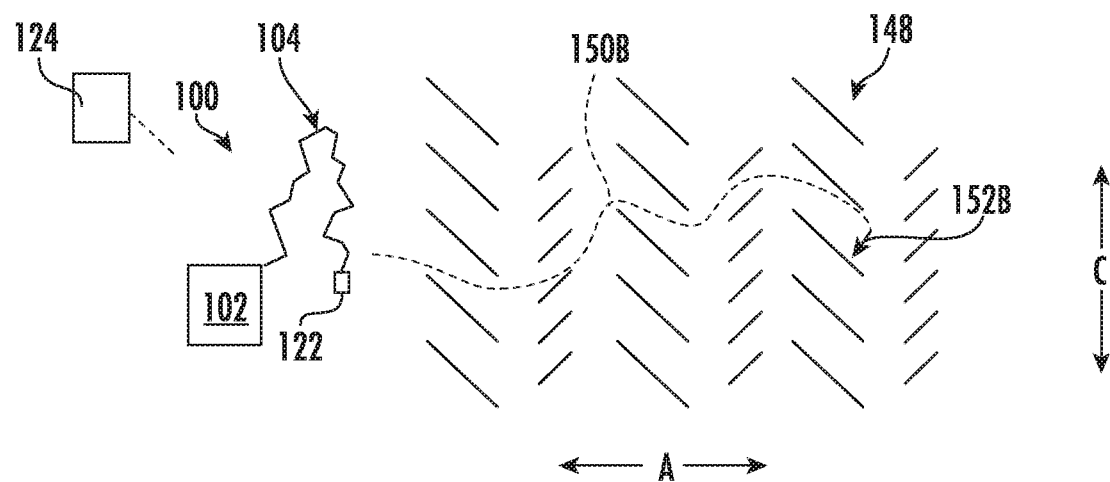
FIG. 10 is a schematic view of a path for a robotic arm of a robotic arm assembly through an environment in accordance with another exemplary embodiment of the present disclosure.

Further, referring now to FIG. 10, an exemplary path 150 through an environment 148 for a robotic arm 104 of a robotic arm assembly 100 to position a utility head 122 of the robotic arm 104 at a desired task position and orientation 152 is provided. More specifically, the environment 148 depicted in FIG. 10 is the same environment 148 depicted in FIG. 8. However, for the embodiment of FIG. 10, the task position and orientation 152 for utility member is different. For example, the task position and orientation 152 of FIG. 8 may be a first task position and orientation 152A, while the task position and orientation 152 of FIG. 10 is a second task position and orientation 152B. Similarly, the path 150 of FIG. 8 may be a first path 150A, while the path 150 of FIG. 10 is a second path 150B.

It will be appreciated that the second path 150B depicted in FIG. 10 for the robotic arm 104 of the robotic arm assembly 100 may be determined in substantially the same way as the path 150 for the robotic arm 104 depicted in FIG. 8 was determined. However, of course, for the embodiment of FIG. 10, the path 150 was determined based on the second task position and orientation 152B, in addition to the position of the base, the root end, or both relative to the environment, and the three-dimensional constraint of the environment.

Notably, it may be desirable for the robotic arm 104 to move directly from the first path 150A to the second path 150B, instead of backing out the robotic arm 104 to where the two paths 150A, 150B overlap. In order to do so, for the embodiment depicted, the controller 124 of the robotic arm assembly 100 may determine a transitional movement of the robotic arm 104 from the first path 150A to the second path 150B, and more specifically, may determine the transitional movement by interpolating one or more transitional paths between the first path 150A the second path 150B.

Figure 11:
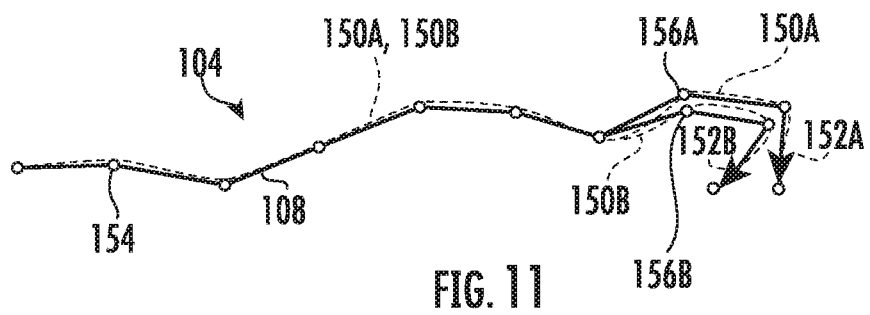
FIG. 11 is a schematic view of two paths for a robotic arm assembly through an environment in accordance with an exemplary embodiment of the present disclosure.
Figure 12:
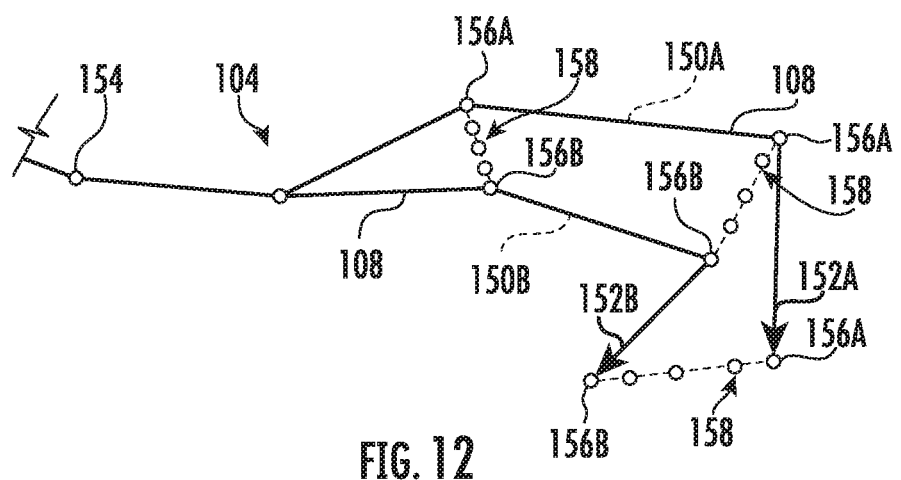
FIG. 12 is a close-up, schematic view of the two exemplary paths of FIG. 11.

For example, referring to FIGS. 11 and 12, the first path 150A is depicted overlain with the second path 150B. As is depicted, the first path 150A and the second path 150B define a plurality of common points 154. Additionally, the first path 150B defines a plurality of points 156A where the first path 150A does not overlap with the second path 150B, and similarly, the second path 150B defines a plurality of points 156B where the second path 150B does not overlap with the first path 150A. Referring particularly to FIG. 12, showing a close-up of the differing points 156A, 156B of the first path 150 and the second path 150, the controller 124 (see FIGS. 8, 10) may be configured to determine a plurality of intermediate points 158 for each joint of the robotic arm 104 between the first path 150 and the second path 150. The controller 124 may move the robotic arm 104 from the first path 150 to the second path 150 by positioning the joints of the robotic arm 104 sequentially at the intermediate points 158 determined.

It should be appreciated that by interpolating the intermediate path(s) to determine the transitional movement of the robotic arm 104 from the first path 150A to the second path 150B, the robotic arm assembly 100 may relatively smoothly and efficiently move from the first task position and orientation 152A to the second task position and orientation 152B.

Figure 13:
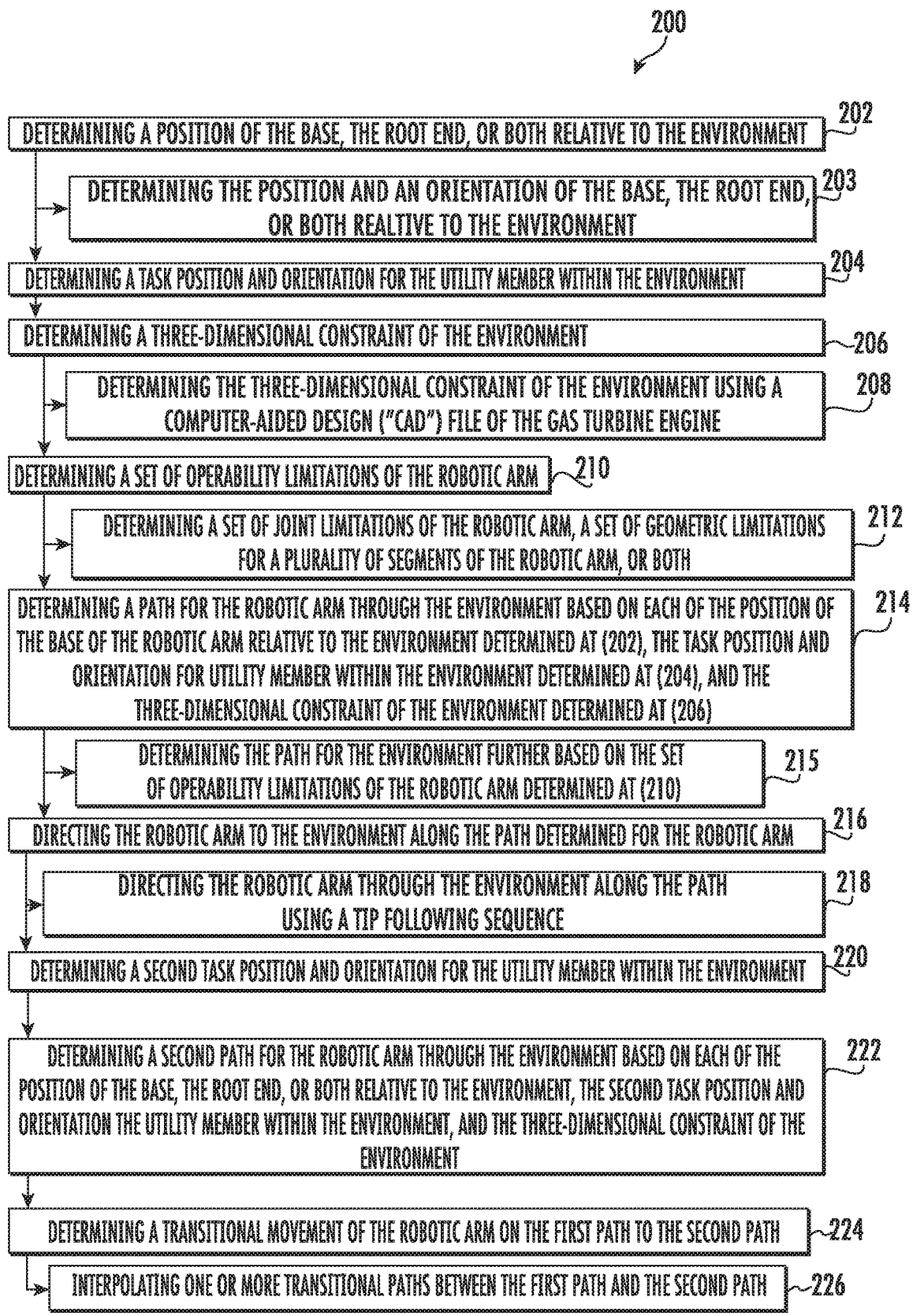
FIG. 13 is a flow diagram of a method for controlling a robotic arm assembly in accordance with an exemplary aspect of the present disclosure.

Referring now to FIG. 13, a method for controlling a robotic arm assembly through an environment is provided. The exemplary method 200 may be utilized with one or more the exemplary robotic arm assemblies described above with reference to FIGS. 1 through 12. Accordingly, the robotic arm assembly may generally include a robotic arm extending between a root end and a distal end, a base, and a utility member. The root end of the robotic arm may be coupled to the base, and the distal end of the robotic arm may include the utility member.

The method 200 generally includes at (202) determining a position of the base, the root end, or both relative to the environment. As will be appreciated, in at least certain exemplary aspects, determining the position of the base, the root end, or both relative to the environment at (202) may further include at (203) determining the position and an orientation of the base, the root end, or both relative to the environment. For example, the base and/or root end of the robotic arm may be mounted on another robot or joint(s) that allow for the modification of a position and/or an orientation of the base and/or root end of the robotic arm. With such an exemplary aspect, the position and/or orientation of the base or root end may be communicated to a controller of the robotic arm assembly, or may be controlled by the controller of the robotic arm assembly (and therefore known by the controller).

Additionally, the method 200 includes at (204) determining a task position and orientation for the utility member within the environment. The task position and orientation may generally define a location and, e.g., an angular orientation for the utility member within the environment to facilitate the utility member performing certain operations. For example, the task position and orientation may be a task position and orientation to allow the utility member to, e.g., direct a laser drill towards a component to, e.g., drill a hole in the component. Additionally, or alternatively, the task position and orientation may be a position and orientation for the utility member within the environment allow the utility member to, e.g., weld a component within the environment, cut a component within the environment, etc.

The method 200 further includes at (206) determining a three-dimensional constraint of the environment. As discussed above in at least certain exemplary aspects, the environment may be a gas turbine engine. With such an exemplary aspect, determining the three-dimensional constraint of the environment at (206) may include determining the three-dimensional constraint of the environment, and more specifically may include at (208) determining the three-dimensional constraint of the environment using a computer-aided design ("CAD") file of the gas turbine engine. However, in other exemplary aspects, any other suitable means may be utilized for determining the three-dimensional constraint for the environment. For example, in other exemplary embodiments, determining the three-dimensional constraint for the environment at (206) may include scanning or inspecting the environment using one or more optical sensors or other sensors.

Referring still to FIG. 13, the exemplary aspect of the method 200 depicted further includes at (210) determining a set of operability limitations of the robotic arm. For the exemplary aspect depicted, determining the set of operability limitations of the robotic arm at (210) includes at (212) determining a set of joint limitations of the robotic arm (e.g., minimum and/or maximum bend angles, degrees of freedom, etc.), a set of geometric limitations for a plurality of segments of the robotic arm (e.g., lengths of the segments, shapes of the segments, etc.), a set of geometric limitations of a utility member of the robotic arm (e.g., length, width, height, etc.), or combination thereof. Notably, the operability limitations may further take into consideration an ability of the links of the robotic arm to move in unison, and/or work together to achieve additional degrees of freedom, increased effective bend angles, etc. Further Further, the exemplary method 200 includes at (214) determining a path for the robotic arm through the environment based on each of the position of the base of the robotic arm relative to the environment determined at (202), the task position and orientation for utility member within the environment determined at (204), and the three-dimensional constraint of the environment determined at (206). More specifically, for the exemplary aspect depicted, determining the path for the robotic arm to the environment at (214) further includes at (215) determining the path for the environment further based on the set of operability limitations of the robotic arm determined at (210). In at least certain exemplary aspects, the path for the robotic arm through the environment may include a plurality of sequential vectors for the robotic arm to follow.

For example, determining the path at (214) may include determining a plurality of sequential coordinates (e.g., X1, Y1, Z1; X2, Y2, Z2; X3, Y3, Z3; etc.) for the robotic arm to follow within the three-dimensional environment. Additionally, it should be appreciated that determining the path at (214) may include determining orientation information for the robotic arm at these positions (and/or between these positions) within the three-dimensional environment. The orientation information may include angular information for the links of the robotic arm at each of the coordinates relative to each axis of the coordinate system of the environment, such that the path includes information for up to six degrees of freedom along some or all of the path. For example, if a tool at the distal end of the robotic arm has a greater extent in one dimension than another (e.g., taller than it is wide), it may further be necessary to ensure the robotic arm moves through the three dimensional environment with the appropriate orientation, in addition to the appropriate position.

Notably, by determining the path for the robotic arm through the environment based on the parameters discussed, including the task position and orientation for the utility member within the environment, a more efficient path may be determined for the robotic arm. More specifically, by determining the path for the robotic arm based on the resulting task position and orientation for the utility member may ensure a path for the robotic arm appropriate for the desired task is determined.

The method 200 further includes, for the exemplary aspect depicted, controlling the snake arm based on the determined path for the snake arm at (214). More specifically, for the exemplary aspect depicted, the method 200 includes at (216) directing the robotic arm tthrough the environment along the path determined for the robotic arm at (214). More specifically, for the exemplary aspect depicted, directing the robotic arm through the environment along the path determined for the robotic arm at (216) includes at (218) directing the robotic arm through the environment along the path using a tip following sequence. As will be appreciated, directing the robotic arm through the environment along the path using a tip following sequence at (218) may include controlling the robotic arm link-by-link, or alternatively by controlling several links as a unit (i.e., a section of the arm as one) to provide for greater degrees of freedom, and/or greater bend angles, than a single joint possesses. Further, it should be appreciated, that in certain exemplary aspects, determining the path at (214) may include determining the path prior to directing the robotic arm through the environment at (216).

In at least certain exemplary aspects, such as the exemplary aspect of the method 200 depicted in FIG. 13, it will be appreciated that it may further be desirable for the robotic arm to perform functions at multiple locations. For example, for the exemplary aspect depicted, the turbofan task position and orientation for the utility member at (204) may be a first task position and orientation, the path for the robotic arm through the environment determined at (216) may be a first path for the robotic arm through the environment, and the method 200 further includes at (220) determining a second task position and orientation for the utility member within the environment. The second task position and orientation for the utility member within the environment is a different task position and orientation than the first task position and orientation. For example, the first task position and orientation for the utility member within the environment may be a starting point of a task, and the second task position and orientation for utility member within the environment may be an ending point of the task. For example, the task may be a cutting task, a welding task, etc. Additionally, or alternatively, the first task may be a first drilling hole, and the second task may be a second drilling hole.

The method 200 further includes at (222) determining a second path for the robotic arm through the environment based on each of the position of the base, the root end, or both relative to the environment, the second task position and orientation the utility member within the environment, and the three-dimensional constraint of the environment. Moreover, the method 200 includes at (224) determining a transitional movement of the robotic arm on the first path to the second path. For the exemplary aspect depicted, determining the transitional movement of the robotic arm from the first path to the second path at (224) includes at (226) interpolating one or more transitional paths between the first path and the second path.

It will be appreciated that in at least certain exemplary aspects, the method 200 may be a computer-implemented method. In such exemplary aspects the above-described steps may be performed by one or more computing devices, such as by the controller 124 described above with reference to FIG. 4, or any other suitable controller or control system.

It will also be appreciated, that although for the exemplary embodiments and aspects described herein, the "environment" through which the exemplary robotic arms extend is described as a gas turbine engine, such as a turbomachine of a gas turbine engine, in other exemplary embodiments and aspects, the exemplary robotic arms described herein may extend through other suitable environments. For example, utilizing the systems and methods described herein, robotic arms may extend through hazardous environments, such as may be found in the nuclear industry, oil drilling industry, etc. Other environments are contemplated as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a robotic arm assembly through an environment, the robotic arm assembly comprising a robotic arm, a base, and a utility member, the robotic arm extending between a root end attached to the base and a distal end including the utility member, the method comprising:
   determining a position of the base, the root end, or both relative to the environment;
   determining a task position and orientation for the utility member within the environment;
   determining a three-dimensional constraint of the environment; and
   determining a path for the robotic arm through the environment based on each of the position of the base, the root end, or both relative to the environment, the task position and orientation for the utility member within the environment, and the three-dimensional constraint of the environment,
   wherein the task position and orientation for utility member within the environment is a starting point or an ending point of a task, and
   wherein the task is a cutting task, a welding task, or a drilling task.

2. The method of claim 1, further comprising:
   directing the robotic arm through the environment along the path determined for the robotic arm through the environment.

3. The method of claim 2, wherein directing the robotic arm through the environment along the path determined for the robotic arm comprises directing the robotic arm through the environment along the path using a tip following sequence.

4. The method of claim 1, wherein the environment is a gas turbine engine, and wherein determining the three-dimensional constraint of the environment comprises determining the three-dimensional constraint the environment using a three-dimensional electronic representation or model of the gas turbine engine.

5. The method of claim 1, further comprising:
   determining a set of operability limitations of the robotic arm, and wherein determining the path for the robotic arm through the environment comprises determining the path for the robotic arm through the environment further based on the set of operability limitations of the robotic arm.

6. The method of claim 5, wherein determining the set of operability limitations of the robotic arm comprises determining a set of joint limitations of the robotic arm, a set of geometric limitations for a plurality of segments of the robotic arm, or both.

7. The method of claim 1, wherein the determined task position and orientation for the utility member is a first task position and orientation for the utility member, wherein the path for the robotic arm through the environment is a first path for the robotic arm through the environment, and wherein the method further comprises:
determining a second task position and orientation for the utility member within the environment; and
determining a second path for the robotic arm through the environment based on each of the position of the base, the root end, or both relative to the environment, the second task position and orientation for the utility member within the environment, and the three-dimensional constraint of the environment,
wherein determining the three-dimensional constraint of the environment comprises obtaining data indicative of position and orientation of cooling holes, and
wherein the task is drilling a hole or drilling through a clogged cooling hole.

8. The method of claim 7, further comprising:
determining a transitional movement of the robotic arm from the first path to the second path.

9. The method of claim 8, wherein determining the transitional movement of the robotic arm from the first path to the second path comprises interpolating one or more transitional paths between the first path and the second path.

10. The method of claim 7, wherein the first task position and orientation for utility member within the environment is the starting point of the task, and wherein the second task position and orientation for the utility member within the environment is the ending point of the task.

11. The method of claim 1, wherein the path for the robotic arm through the environment comprises a plurality of sequential vectors for the robotic arm to follow.

12. A computer implemented method for controlling a robotic arm assembly through a gas turbine engine, the robotic arm assembly comprising a robotic arm, a base, and a utility member, the robotic arm extending between a root end attached to the base and a distal end including the utility member, the method comprising:
determining, by one or more computing devices, a position of the base, the root end, or both relative to the gas turbine engine;
determining, by the one or more computing devices, a task position and orientation for the utility member within the gas turbine engine;
determining, by the one or more computing devices, a three-dimensional constraint of the gas turbine engine; and
determining, by the one or more computing devices, a path for the robotic arm through the gas turbine engine based on each of the position of the base, the root end, or both relative to the gas turbine engine, the task position and orientation for the utility member within the gas turbine engine, and the three-dimensional constraint of the gas turbine engine,
wherein the task position and orientation for utility member within the environment is a starting point or an ending point of a task, and wherein the task is a cutting task, a welding task, or a drilling task.

13. The computer-implemented method of claim 12, further comprising:
directing, by the one or more computing devices, the robotic arm through the gas turbine engine along the path determined for the robotic arm through the gas turbine engine.

14. The computer-implemented method of claim 12, wherein determining, by the one or more computing devices, the three-dimensional constraint of the gas turbine engine comprises determining, by the one or more computing devices, the three-dimensional constraint the gas turbine engine using a CAD file of the gas turbine engine.

15. The computer-implemented method of claim 12, further comprising:
determining, by the one or more computing devices, a set of operability limitations of the robotic arm, and wherein determining, by the one or more computing devices, the path for the robotic arm through the gas turbine engine comprises determining, by the one or more computing devices, the path for the robotic arm through the gas turbine engine further based on the set of operability limitations of the robotic arm.

16. The computer-implemented method of claim 15, wherein determining, by the one or more computing devices, the set of operability limitations of the robotic arm comprises determining, by the one or more computing devices, a set of joint limitations of the robotic arm, a set of geometric limitations for a plurality of segments of the robotic arm, or both.

17. The computer-implemented method of claim 12, wherein the determined task position and orientation for the utility member is a first task position and orientation for the utility member, wherein the path for the robotic arm through the environment is a first path for the robotic arm through the gas turbine engine, and wherein the method further comprises:
determining, by the one or more computing devices, a second task position and orientation for the utility member within the gas turbine engine; and
determining, by the one or more computing devices, a second path for the robotic arm through the gas turbine engine based on each of the position of the base, the root end, or both relative to the gas turbine engine, the second task position and orientation for the utility member within the gas turbine engine, and the three-dimensional constraint of the gas turbine engine,
wherein determining the three-dimensional constraint of the environment comprises obtaining data indicative of position and orientation of cooling holes, and
wherein the task is drilling a hole or drilling through a clogged cooling hole.

18. The computer-implemented method of claim 17, further comprising:
determining, by the one or more computing devices, a transitional movement of the robotic arm from the first path to the second path.

19. A robotic arm assembly comprising:
a base;
a utility member;
a robotic arm extending between a root end and a distal end, the root end of the robotic arm coupled to the base and the distal end including the utility member; and
a controller operable with the base, the robotic arm, or both and comprising one or more processors and memory, the memory storing data, the data including instructions that when executed by the one or more processors cause the robotic arm assembly to perform functions, the functions including:
  determining a position of the base, the root end, or both relative to an environment;
  determining a task position and orientation for the utility member within the environment;
  determining a three-dimensional constraint of the environment; and
determining a path for the robotic arm through the environment based on each of the position of the base, the root end, or both relative to the environment, the task position and orientation for the utility member within the environment, and the three-dimensional constraint of the environment,
  wherein the task position and orientation for utility member within the environment is a starting point or an ending point of a task, and
  wherein the task is a cutting task, a welding task, or a drilling task.

20. The robotic arm assembly of claim 19, wherein the instructions further comprise directing the robotic arm through the environment along the path determined for the robotic arm through the environment.

* * * * *